United States Patent
Chiu et al.

(10) Patent No.: US 8,725,863 B2
(45) Date of Patent: May 13, 2014

(54) METHOD FOR OBTAINING EXTERNAL IP ADDRESS AND ITS NETWORK PROTOCOL SYSTEM

(75) Inventors: Kuo-Shu Chiu, Taipei (TW); Chien-Chou Chen, Taipei (TW); Szu-Hsien Lee, Taipei (TW); Yu-Fang Chiu, Taipei (TW)

(73) Assignee: Inventec Corporation, Taipei (TW)

( * ) Notice: Subject to any disclaimer, the term of this patent is extended or adjusted under 35 U.S.C. 154(b) by 293 days.

(21) Appl. No.: 13/434,383

(22) Filed: Mar. 29, 2012

(65) Prior Publication Data

US 2013/0166713 A1  Jun. 27, 2013

(30) Foreign Application Priority Data

Dec. 23, 2011  (TW) .............................. 100148445 A

(51) Int. Cl.
G06F 15/173 (2006.01)
G06F 15/16 (2006.01)

(52) U.S. Cl.
USPC ............................ 709/223; 709/245; 709/220

(58) Field of Classification Search
None
See application file for complete search history.

(56) References Cited

U.S. PATENT DOCUMENTS

| 7,577,155 | B2* | 8/2009 | Yamamoto | 370/400 |
| 2004/0261116 | A1* | 12/2004 | Mckeown et al. | 725/109 |
| 2007/0299942 | A1* | 12/2007 | Lu et al. | 709/220 |
| 2012/0269092 | A1* | 10/2012 | Hansen et al. | 370/254 |

FOREIGN PATENT DOCUMENTS

TW   580621   3/2004

* cited by examiner

*Primary Examiner* — John B. Walsh
(74) *Attorney, Agent, or Firm* — Morris Manning & Martin LLP; Tim Tingkang Xia, Esq.

(57) ABSTRACT

A method for obtaining an external IP address and its network protocol system are provided. A rack system of the network protocol system comprises a rack management controller (RMC), a power distribution unit and at least one node server. When a Dynamic Host Configuration Protocol (DHCP) service is lost in the rack system, a jumper of the rack management controller is detected to obtain an identification code. Then, a first temporary IP address of the rack management controller is obtained based on the identification code and a first table, and a first command package is sent to the power distribution unit by the rack management controller. After the first command package is received by the power distribution unit, an IP assign service is activated to set a second temporary IP address of the node server so that the node server can still communicate with the system management terminal.

10 Claims, 4 Drawing Sheets

METHOD FOR OBTAINING EXTERNAL IP ADDRESS AND ITS NETWORK PROTOCOL SYSTEM

CROSS-REFERENCE TO RELATED APPLICATIONS

This non-provisional application claims priority under 35 U.S.C. §119(a) on Patent Application No(s). 100148445 filed in Taiwan, R.O.C. on Dec. 23, 2011, the entire contents of which are hereby incorporated by reference.

BACKGROUND

1. Technical Field

The present disclosure relates to a method for obtaining an external IP address and more particularly to a method for obtaining an external IP address and its network protocol system when a Dynamic Host Configuration Protocol (DHCP) service is lost.

2. Related Art

In the era of rapid development of information technology, the digitization of corporations has become a trend and the business requirements of corporations can no longer be met by common personal computer. Therefore, servers with advanced computing capability are introduced into the market to meet the requirements of digitization of corporations. In order to satisfy the demands in the market, a single server has gradually evolved into a server system composed of a plurality of servers. The servers are placed in a rack system, and managed by a system management terminal via a rack management controller in the rack system.

Generally, a BIOS boot program and an operating system (OS) are installed in each of the servers of the rack systems, and a Dynamic Host Configuration Protocol (DHCP) service is provided by the operation system for the rack system. An IP address is provided by the Dynamic Host Configuration Protocol (DHCP) service for each of the servers in each of the rack systems. Accordingly, the server is enabled to communicate with an external LAN.

However, if the Dynamic Host Configuration Protocol (DHCP) service is closed, or if the Dynamic Host Configuration Protocol (DHCP) service or an IP router is malfunctioned, or if the local area network (LAN) of the Dynamic Host Configuration Protocol (DHCP) service or the IP router is disconnected or failed, the server will be unable to communicate externally through the LAN.

SUMMARY

The method for obtaining an external IP address disclosed in the disclosure is suitable to be used in a rack system which has lost a Dynamic Host Configuration Protocol (DHCP) service. Firstly, a jumper of a rack management controller is detected to obtain an identification (ID) code. Then, a first temporary IP address of the rack management controller is obtained based on the identification code and a first table, and an external LAN is set based on the first temporary IP address.

Then, a first command package including a temporary IP address set is sent to a power distribution unit by the rack management controller based on a second table stored in the rack management controller. After the first command package is received by the power distribution unit, an IP assign service is activated to set a second temporary IP address of a node server. The temporary IP address set including the second temporary IP address is provided by the second table.

The method for obtaining an external IP address can be embodied in a network protocol system which comprises a rack system. The rack system comprises a rack management controller (RMC), a power distribution unit and at least one node server. The rack management controller comprises a jumper which can be detected when a Dynamic Host Configuration Protocol (DHCP) service is lost in the network protocol system in order to obtain an identification code. Then, a first temporary IP address is obtained based on the identification code and a first table, and a first command package including a temporary IP address set is outputted based on a second table. The power distribution unit is connected to the rack management controller for receiving the first command package to activate an IP assign service and to generate a second temporary IP address. The temporary IP address set including the second temporary IP address is provided by the second table. The node server is connected to the power distribution unit for obtaining the second temporary IP address via the power distribution unit.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1A:
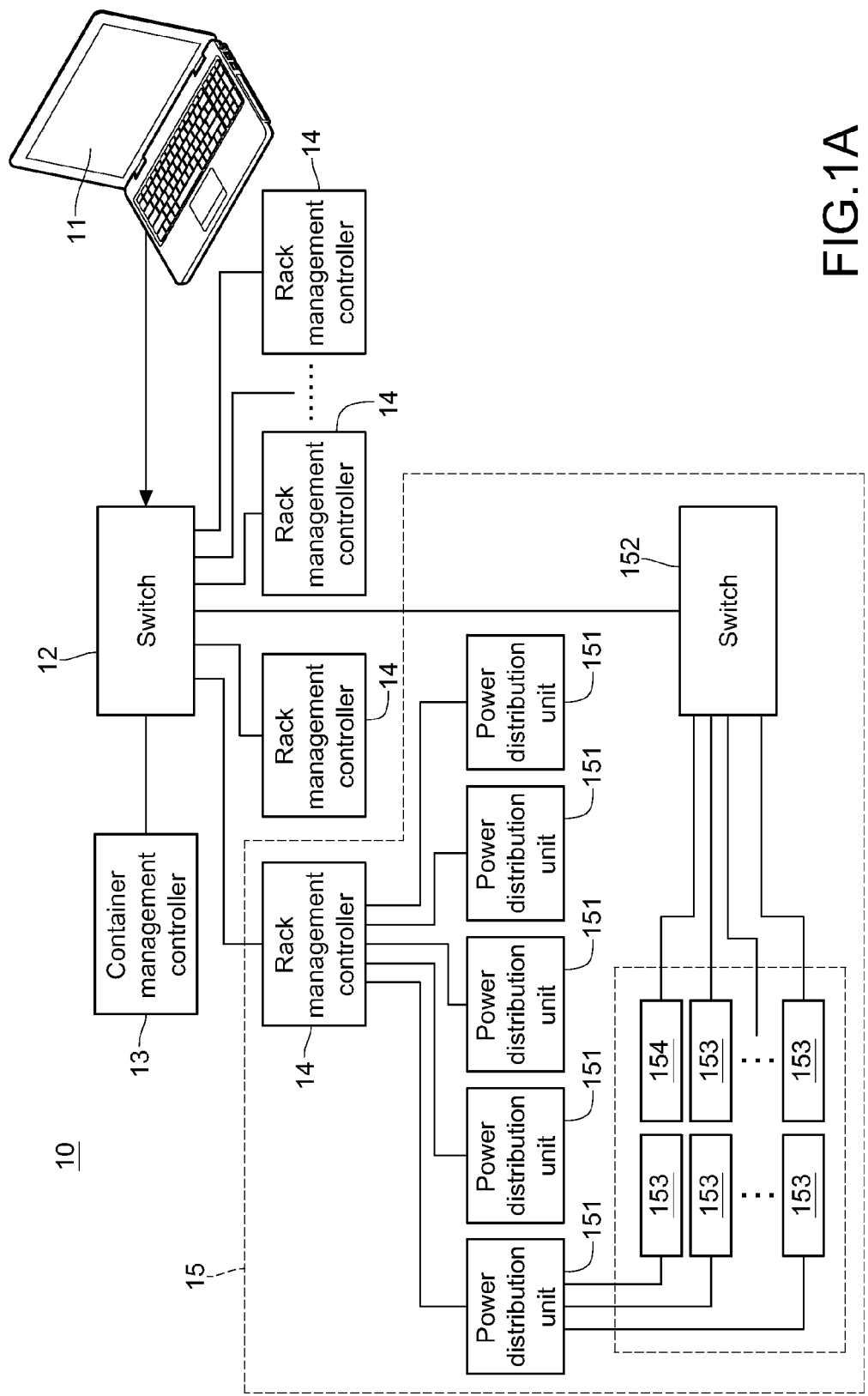
FIG. 1A is a structural illustration of a network protocol system under a Dynamic Host Configuration Protocol (DHCP) service according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the abovementioned problems, some embodiments of the disclosure provides methods for obtaining an external IP address and network protocol system, by which the problem of each of the node servers in the rack system being unable to communicate with an external LAN can be solved if the Dynamic Host Configuration Protocol (DHCP) service is failed.

Referring to FIG. 1A, which is a structural illustration of a network protocol system under a Dynamic Host Configuration Protocol (DHCP) service according to an embodiment of the disclosure. A network protocol system 10 of this embodiment is referred to a server system as an example, but the network protocol system 10 is not limited to it. The network protocol system 10 comprises a system management terminal 11, a switch 12, a container management controller (CMC) 13 and a plurality of rack systems. The system management terminal 11 is connected to the switch 12, and the switch 12 is connected to the container management controller 13 and each of the rack systems.

The system management terminal 11 is used for providing a Dynamic Host Configuration Protocol (DHCP) service via the switch 12 to manage an external LAN and for distributing different temporary IP addresses to different devices or systems. The switch 12 provides a plurality of connecting ports (not illustrated in the drawing) for connecting with the rack systems. When each of the connecting ports is connected successfully, a Media Access Control Address (MAC address) of each of the successfully connected devices or systems is obtained by a central processing unit (not illustrated in the drawing) of the switch 12 via the Address Resolution Protocol (ARP), and the MAC addresses are stored as a look up table. The container management controller 13 can be disposed in a container server for managing the operation of a physical storage or a cloud storage via the switch 12.

Each of the rack systems has a local area network (LAN). In an embodiment, a rack system 15 comprises a rack management controller (RMC) 14, a plurality of power distribution units (PDU) 151, a switch 152 and a plurality of node servers.

The rack management controller 14 is connected to each of the power distribution units 151. In an embodiment, one of the power distribution units 151 can be connected to the node servers 153 and the node server 154 via an internal integrated circuit (IC) bus.

The node servers (comprising the node servers 153 and the node server 154) connected to the power distribution unit 151 can be connected with each other in series or in parallel. The node server 154 and each of the node servers 153 are connected to the switch 152 respectively.

When the Dynamic Host Configuration Protocol (DHCP) service is in normal operation, an external IP address is obtained by the node server 154 of the rack system 15 via the switch 152 for managing the internet connection status of each of the node servers 153 in the rack system 15. Therefore, the rack management controller (RMC) 14 can be disposed in a computer, but it is not limited to it.

Each of the node serves represents a server, and each of the node serves comprises a baseboard management controller (BMC) (not illustrated in the drawing). In an embodiment, each of the node serves can communicate with the corresponding power distribution unit 151 and the switch 152 via the corresponding baseboard management controller. In an embodiment, the Dynamic Host Configuration Protocol (DHCP) service is executed by the node server 154 via the switch 152.

Figure 1B:
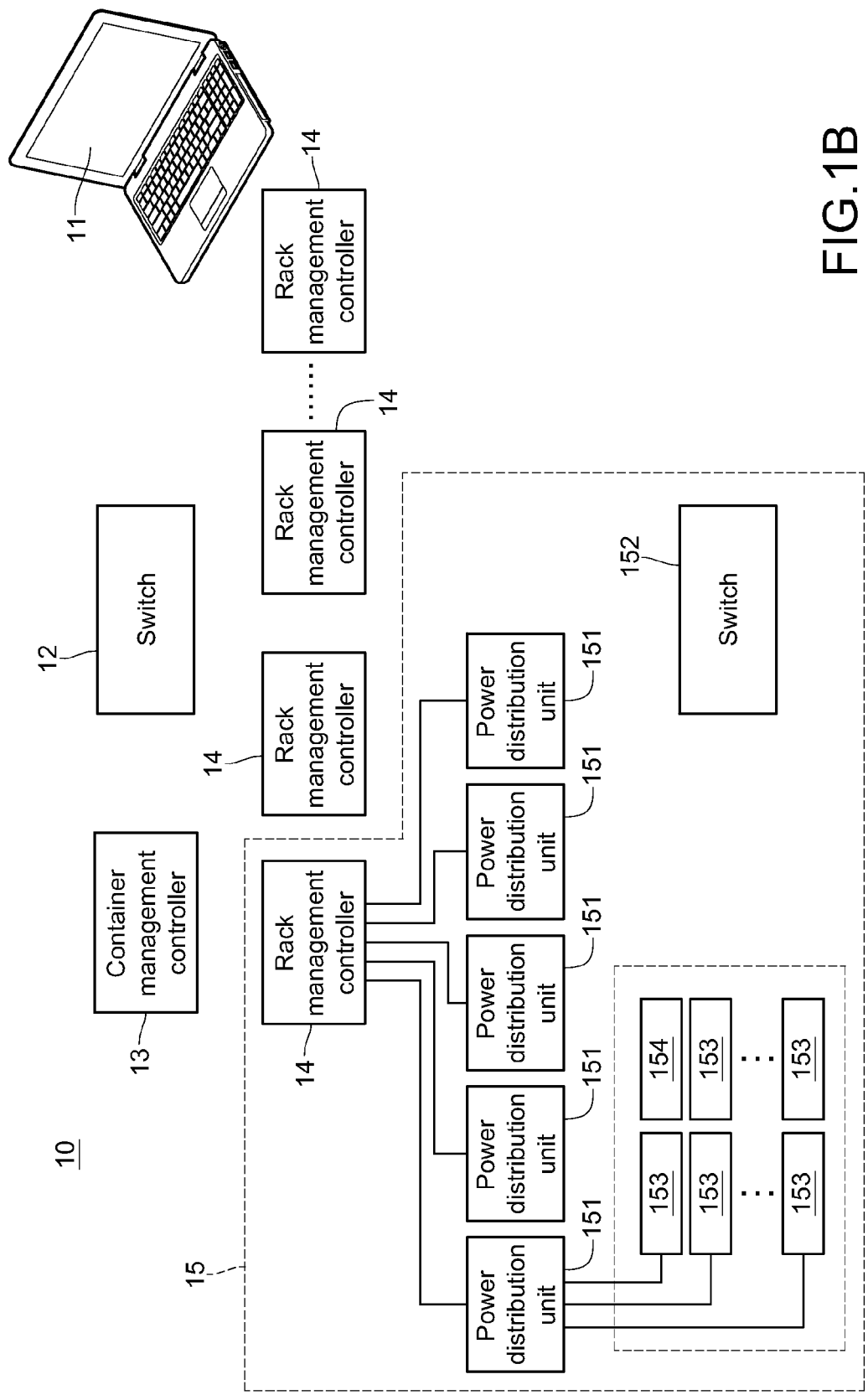
FIG. 1B is a structural illustration of the network protocol system without the Dynamic Host Configuration Protocol (DHCP) service according to an embodiment of the disclosure.
Figure 2:
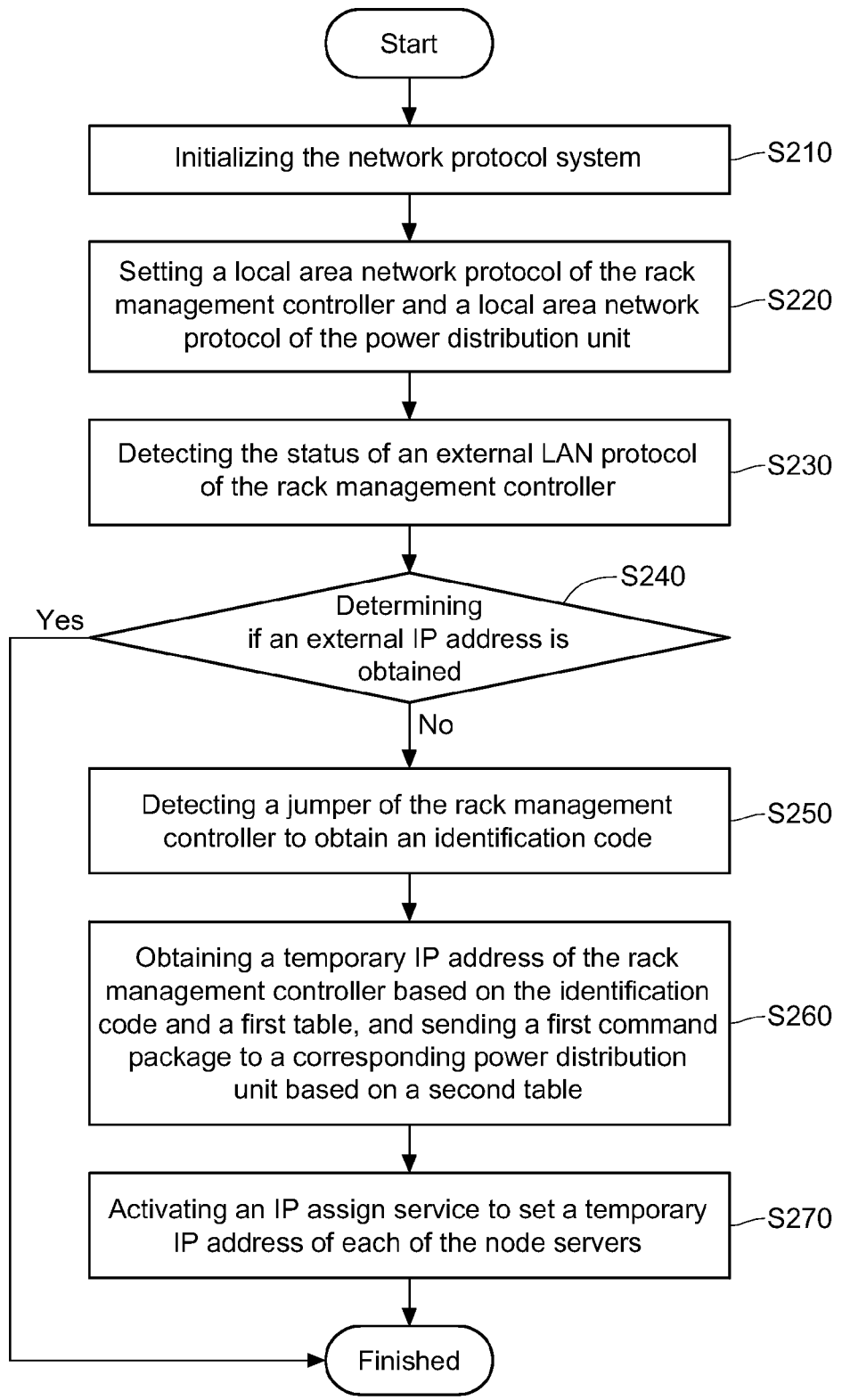
FIG. 2 is an operational flow chart of the network protocol system of the disclosure.

Please refer to FIGS. 1B and 2 for further descriptions of the disclosure. FIG. 1B is a block diagram of the network protocol system without the Dynamic Host Configuration Protocol (DHCP) service according to an embodiment of the disclosure; and FIG. 2 is an flow chart of the network protocol system of the disclosure. Firstly, when the network protocol system 10 (the firmware of each of the rack management controllers 14, the firmware of each of the power distribution units 151 and the firmware of each of the node servers) is started, the network protocol system 10 is initialized as shown in step S210.

The rack system 15 tries to set a local area network (LAN) protocol of one of the rack management controllers 14 in order to obtain a local area network (LAN) IP address and tries to set a local area network (LAN) protocol of each of the power distribution units 151 in order to obtain a local area network (LAN) IP address, so that each of the power distribution units 151 can communicate with the rack management controller 14 as shown in step S220.

As shown in step S230, the status of an external LAN protocol is detected by the rack management controller 14 to check whether the communication with the external LAN is normal, so that the rack system 15 is able to communicate with an external LAN.

In step S240, it is determined if an external IP address is obtained based on the status of the external LAN protocol detected by the rack management controller 14. If the external IP address is detected by the rack management controller 14, it means the Dynamic Host Configuration Protocol (DHCP) service is operated normally.

As shown in FIG. 1B, if no external IP address is detected by the rack management controller 14, it means the Dynamic Host Configuration Protocol (DHCP) service is failed or the communication between the node server 154 and the switch 152 is failed, and therefore connection to the external LAN is not available. At this point, a jumper disposed in the rack management controller 14 is detected by the rack management controller 14 in order to obtain an identification (ID) code as shown in step S250.

Then, a temporary IP address is obtained by the rack management controller 14 based on the identification code and a first table to be used as the external IP address. The first table is used for indexing the temporary IP address of the rack management controller 14 and is pre-stored in the rack management controller 14. In an embodiment, the temporary IP address is allocated by the first table correspondingly based on a corresponding identification code and a jumper parameter as shown in the form 1 below.

TABLE 1

| Number | Jumper Parameter | Identification Code | Temporary IP Address |
|---|---|---|---|
| 1 | 0000b | 00h | 10.10.1.1 |
| 2 | 0001b | 01h | 10.10.2.1 |
| 3 | 0010b | 02h | 10.10.3.1 |
| 4 | 0011b | 03h | 10.10.4.1 |
| 5 | 0100b | 04h | 10.10.5.1 |
| 6 | 0101b | 05h | 10.10.6.1 |
| 7 | 0110b | 06h | 10.10.7.1 |
| 8 | 0111b | 07h | 10.10.8.1 |
| 9 | 1000b | 08h | 10.10.9.1 |
| 10 | 1001b | 09h | 10.10.10.1 |
| 11 | 1010b | 10h | 10.10.11.1 |
| 12 | 1011b | 11h | 10.10.12.1 |

A first command package of the Intelligent Platform Management Interface (IPMI) specification or other specification is sent sequentially to the corresponding power distribution units 151 by the rack management controller 14 via the local area network (LAN) based on a second table as shown in step S260. In an embodiment, the relationship between each of the power distribution units 151 and a corresponding temporary IP address set is provided in the second table which is pre-stored in the rack management controller 14, as shown in the table 2 below. One of the corresponding temporary IP address sets is included in the first command package, and the temporary IP addresses of the node servers are included in the temporary IP address set as shown in the table 2.

TABLE 2

| Number of Power Distribution Unit | Temporary IP Address Set |
|---|---|
| 1 | 10.10.X.10~10.10.X.24 |
| 2 | 10.10.X.30~10.10.X.44 |
| 3 | 10.10.X.50~10.10.X.64 |
| 4 | 10.10.X.70~10.10.X.84 |
| 5 | 10.10.X.90~10.10.X.104 |

When the first command package is received by the corresponding power distribution unit 151, it means that the network protocol system 10 is lacked of a DHCP/IP sharing mechanism. Therefore, an IP assign service is activated by the power distribution unit 151 so as to enable each of the node servers to obtain a temporary IP address (external IP address) and to be able to communicate with the external LAN as shown in step S270.

Figure 3:
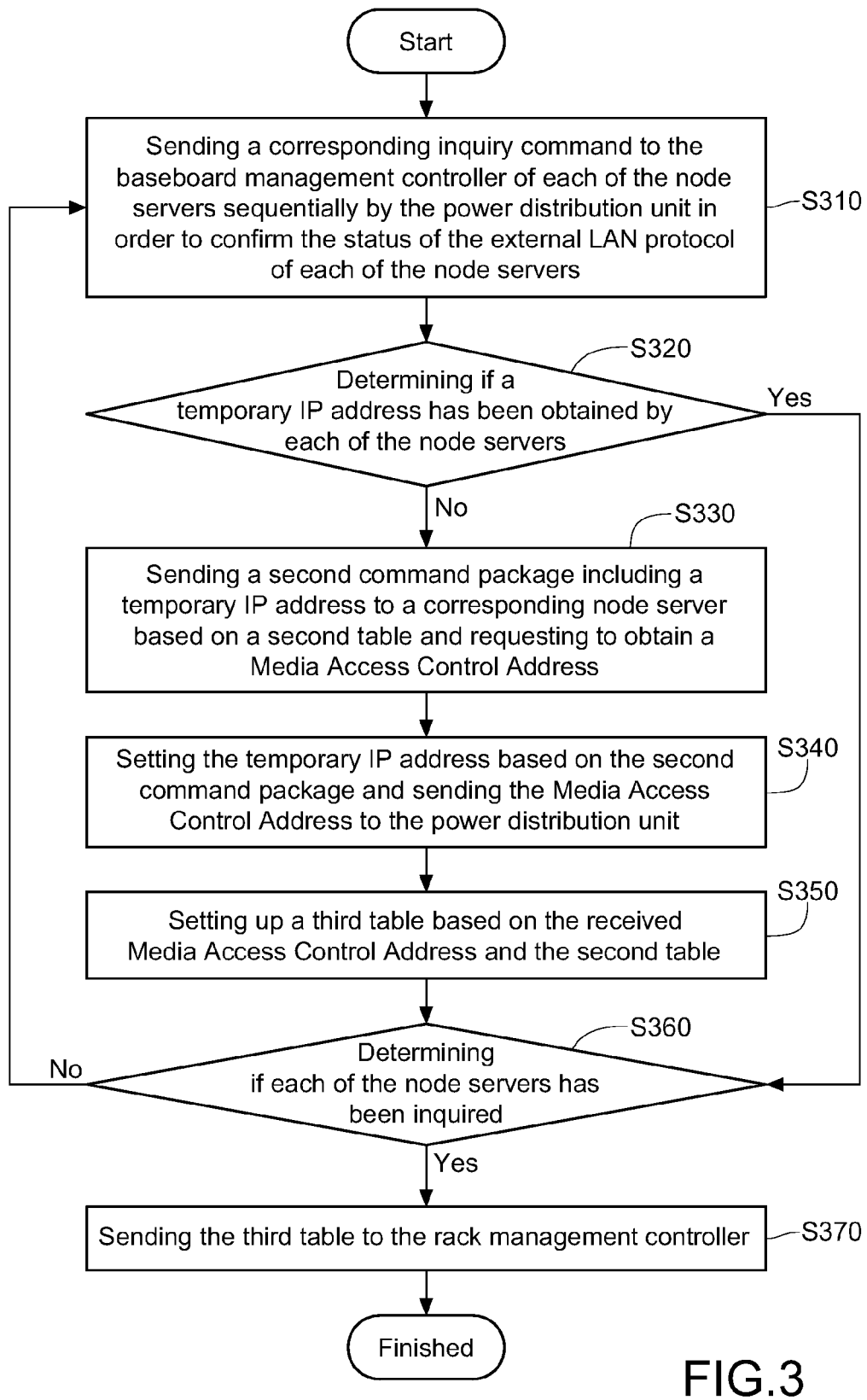
FIG. 3 is an operational flow chart of the network protocol system of the disclosure executing an IP assign service.

Please refer to FIGS. 1B and 3; FIG. 3 is an flow chart of the network protocol system of the disclosure executing an IP assign service.

One of the power distribution units 151 is used as an example. Firstly, a corresponding inquiry command of the Intelligent Platform Management Interface (IPMI) specification or other specification is sent sequentially to the baseboard management controller of each of the node servers by the power distribution unit 151 in order to confirm the status of the external LAN protocol of each of the node servers, and to obtain a Media Access Control Address (MAC address) of the inquired node server as shown in step S310.

It is determined if an external IP address has been obtained by each of the node servers based on the status of the external LAN protocol of each of the node servers as shown in step S320. If the external IP address has been obtained for the inquired node server, proceed to step S360 to determine if each of the node servers has been inquired. Go back to the step S310 if there is still node server which has not been inquired.

If there is node server which has not obtained a temporary IP address, a second command package of the Intelligent Platform Management Interface (IPMI) specification or other specification including a temporary IP address is sent by the power distribution unit 151 based on a second table to request a baseboard management controller of a corresponding node server to set as the temporary IP address as shown in step S330.

When the second command package is received by the corresponding node server, the temporary IP address is set based on the second command package, and a corresponding Media Access Control Address (MAC address) is sent to the power distribution unit 151 as shown in step S340. After the Media Access Control Address (MAC address) is received, a third table is set up by the power distribution unit 151 based on the Media Access Control Address (MAC address) and the second table as shown in step S350. In an embodiment, the relationship between a Media Access Control Address (MAC address) and a second temporary IP address of each of the node servers is provided by the third table.

In step S360, go back to the step S310 if there is node server which has not been inquired. After all the node servers have been inquired, the third table is sent to the rack management controller 14 by the power distribution unit 151 so that the rack management controller 14 is aware that a temporary IP address has set for each of the node servers as shown in step S370.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A method for obtaining an external IP address suitable to be used in a rack system, the method for obtaining an external IP address comprising steps of:

detecting a jumper of a rack management controller to obtain an identification code when a Dynamic Host Configuration Protocol (DHCP) service being lost in the rack system;
   reading a first table;
   obtaining a first temporary IP address of the rack management controller as a first external IP address based on the identification code and the first table;
   setting an external LAN based on the first temporary IP address;
   sending a first command package including a temporary IP address set to a power distribution unit by the rack management controller based on a second table stored in the rack management controller; and
   after the first command package being received by the power distribution unit, activating an IP assign service to set a second temporary IP address of a node server as a second external IP address, wherein the temporary IP address set including the second temporary IP address is provided by the second table.

2. The method for obtaining an external IP address as claimed in claim 1, wherein the IP assign service comprises:

sending a second command package to the node server by the power distribution unit for making the node server setting the second temporary IP address, wherein the second command package includes the second temporary IP address;
   sending a Media Access Control Address of the node server to the power distribution unit based on the second command package;
   establishing a third table based on the Media Access Control Address and the second table received by the power distribution unit, wherein the relationship between the Media Access Control Address and the second temporary IP address is provided by the third table; and
   sending the third table to the rack management controller by the power distribution unit.

3. The method for obtaining an external IP address as claimed in claim 2, wherein the IP assign service further comprises:

before the second command package is sent by the power distribution unit, sending an inquiry command to the node server by the power distribution unit to confirm if the node server has the second temporary IP address;
   if the node server has the second temporary IP address, establishing the third table based on the second temporary IP address and the Media Access Control Address of the node server, and sending the third table to the rack management controller by the power distribution unit; and
   if the node server dose not have the second temporary IP address, sending the second command package to the node server based on the second table so that the second temporary IP address can be obtained by the node server.

4. The method for obtaining an external IP address as claimed in claim 3, wherein the first command package, the second command package and the inquiry command are of the Intelligent Platform Management Interface specification.

5. The method for obtaining an external IP address as claimed in claim 1, wherein the communication between the power distribution unit and the node server is executed via an internal integrated circuit busbar.

6. A network protocol system, comprising:
   a system management terminal for providing a Dynamic Host Configuration Protocol service; and
   a rack system, comprising:

a rack management controller comprising a jumper, when the Dynamic Host Configuration Protocol service being lost in the network protocol system, the rack management controller being configured for obtaining an identification code by detecting the jumper, obtaining a first temporary IP address based on the identification code and a first table, and outputting a first command package including a temporary IP address set based on a second table;

a power distribution unit connected to the rack management controller for receiving the first command package in order to activate an IP assign service and to generate a second temporary IP address, wherein the temporary IP address set including the second temporary IP address is provided by the second table; and at least one node server connected to the power distribution unit for obtaining the second temporary IP address from the power distribution unit and to further communicate with the system management terminal.

7. The network protocol system as claimed in claim 6, wherein the rack system further comprises a first switch connected to the node server, the first switch is configured to communicate with an external LAN, the network protocol system further comprises a system management terminal and a second switch, the system management terminal is configured to manage the external LAN, the second switch is connected to the system management terminal, the first switch and the rack management controller for being used as a communication platform for the system management terminal, the first switch and the rack management controller.

8. The network protocol system as claimed in claim 6, wherein the node server provides the Dynamic Host Configuration Protocol service and communicates with the power distribution unit via an internal integrated circuit bus.

9. The network protocol system as claimed in claim 6, wherein the IP assign service enables the power distribution unit to send a second command package including the second temporary IP address to the node server so that the second temporary IP address is set by the node server, a Media Access Control Address is sent to the power distribution unit by the node server based on the second command package and the second temporary IP address is set, then a third table is set up by the power distribution unit based on the received Media Access Control Address and the third table is sent to the rack management controller, wherein the relationship between the Media Access Control Address and the second temporary IP address is provided by the third table.

10. The network protocol system as claimed in claim 9, wherein the IP assign service enables the power distribution unit to send an inquiry command to the node server to confirm if the node server has the second temporary IP address, if the node server has the second temporary IP address, the third table is set up by the power distribution unit based the second temporary IP address, and the third table is sent to the rack management controller, and if the node server has not obtained the second temporary IP address, the second command package is sent to the node server by the power distribution unit so that the second temporary IP address can be obtained by the node server.

* * * * *